United States Patent
Cheng

(10) Patent No.: US 7,002,984 B1
(45) Date of Patent: Feb. 21, 2006

(54) METHOD AND APPARATUS FOR PARALLEL OPERATION IN A MULTIPLE ACCESS NETWORK

(76) Inventor: Alexander L. Cheng, 12 Hidden Glen Rd., Scarsdale, NY (US) 10583

( * ) Notice: Subject to any disclaimer, the term of this patent is extended or adjusted under 35 U.S.C. 154(b) by 0 days.

(21) Appl. No.: 09/523,185

(22) Filed: Mar. 10, 2000

(51) Int. Cl.
H04J 3/16 (2006.01)

(52) U.S. Cl. .................. 370/437; 370/447; 370/468; 710/107

(58) Field of Classification Search ............ 370/431, 370/442, 443, 444, 445, 446, 447, 448, 449, 370/450, 451, 458, 461; 340/825.5, 825.51, 340/825.52; 710/107, 109, 110, 111, 112, 710/113, 114, 115, 117, 119, 120, 121, 124
See application file for complete search history.

(56) References Cited

U.S. PATENT DOCUMENTS

| | | | | |
|---|---|---|---|---|
| 4,593,282 A | * | 6/1986 | Acampora et al. | 340/825.5 |
| 5,012,469 A | * | 4/1991 | Sardana | 370/322 |
| 5,235,592 A | * | 8/1993 | Cheng et al. | 370/451 |
| 5,237,695 A | * | 8/1993 | Skokan et al. | 709/225 |
| 5,319,641 A | * | 6/1994 | Fridrich et al. | 370/447 |
| 5,544,158 A | * | 8/1996 | Oprea et al. | 370/438 |
| 5,563,883 A | * | 10/1996 | Cheng | 370/449 |
| 5,740,174 A | * | 4/1998 | Somer | 370/402 |
| 5,742,239 A | * | 4/1998 | Siloti | 340/825.5 |
| 5,793,307 A | * | 8/1998 | Perreault et al. | 340/825.5 |
| 5,940,399 A | * | 8/1999 | Weizman | 370/445 |
| 6,006,271 A | * | 12/1999 | Grabiec et al. | 709/235 |
| 6,256,317 B1 | * | 7/2001 | Holloway et al. | 370/447 |

* cited by examiner

Primary Examiner—Bob A. Phunkulh

(57) ABSTRACT

A system is disclosed that improves quality-of-service (QoS) by parallel operation in a multiple access network and offers a flexible way to adjust network performance by dynamically allocating channels to be assigned dynamically to communicating nodes. The multiple access operation is improved via parallel operation for non-contending nodes, and smaller group of nodes for contention resolution. When a collision is detected by the communicating nodes in a communication system nodes engaged in a contention switch to a contention resolution channel to resolve contention while nodes not engaged in the contention continue their normal operation in the regular channel. After the contention is resolved and communication is accomplished, the nodes that have switched will switch back to their regular channel. Support of different service quality levels based on varying group size is made possible in a multiple access network while providing compatibility with existing protocol.

18 Claims, 2 Drawing Sheets

METHOD AND APPARATUS FOR PARALLEL OPERATION IN A MULTIPLE ACCESS NETWORK

FIELD OF THE INVENTION

The present invention pertains generally to multiple access communication systems, and more specifically to a method and apparatus for improving quality-of-service (QoS) of a multiple access network.

BACKGROUND OF THE INVENTION

The communication protocol provides the rules for communication. The protocols govern the behavior of each communicating node on how to access the network, how to signal other nodes of its current situation and need, how to transfer data, and unique to a multiple access network, how to detect and resolve contention (often called collision). To help manage the complexity of a communication system, it is customary to divide the functionality of a communication system in layers of protocols. The International Standard Organization has specified seven layers from lower to higher: physical, media access control (MAC) or link, network, transport, session, presentation, and application layers. The present invention deals mostly with the physical layer for multiple channels and the MAC layer protocol for access. The management issue, including quality-of-service (QoS) policy, is a concern to be dealt with by the higher layer protocol. The bandwidth of communication network is normally separated into two types of channels—signaling and traffic bearer. In some multiple access networks, e.g. Carrier Sense Multiple Access with Collision Detect (CSMA/CD), these two types of channels are one and the same.

Communication systems with multiple access network have been providing satisfactory services in many markets, such as local area network (LAN), cellular telephony, and more recently broadband network based on CATV infrastructure. More recently, galvanized by the potential of a broadband network, cable modems conforming to CableLabs' Data Over Cable Service Interface Specification (DOCSIS) have been deployed in increasing numbers. These multiple access protocols provide satisfactory services when the network load is light (actually these networks are considered unstable if the usage reaches 80% of the maximum network throughput). Even with a light network load, there is no guarantee of QoS in these multiple access networks. At the same time, there is increasing pressure to put time-sensitive services, such as voice and video, on these networks. Moreover, during contention resolution phase, the services are interrupted.

The present invention overcomes the aforementioned limitations with the following objects:
Efficient and flexible use of communication facilities;
Compatible with and complementary to existing protocols;
Enabling various service quality levels; and
Providing seamless growth path.

Further objects and advantages of the present invention will become apparent from a consideration of the drawings and ensuing description thereof.

DISCUSSION OF PRIOR ART

CSMA/CD is detailed in IEEE 802 series specification. DOCSIS is published by CableLabs.

There have been a number of proposals to improve the efficiency of a multiple access network. U.S. Pat. No. 5,235,592 provides a circuit-based capability to token-bus protocol. U.S. Pat. No. 5,319,641 offers a higher priority data transfer capability to standard CSMA/CD type protocol. There are also proposals to augment the standard protocol with special device. U.S. Pat. No. 5,740,174 uses repeater and expansion bus to improve communication capability, while U.S. Pat. No. 5,940,399 uses multi-port repeater for arbitration. Unique radio frequency signals are used in U.S. Pat. No. 5,657,326 for wireless implementation of standard multiple access protocol.

U.S. Pat. No. 5,563,883 provides a method for communication in a multiple access network and a dynamic bandwidth-on-demand scheme. U.S. Pat. No. 5,793,307 offers a hybrid limited contention and polling scheme with similar motivation.

U.S. Pat. No. 5,742,239 discloses a method to assign time slots to nodes in a multiple access network for arbitration. When the traffic on the network is light, defined by no request of use for a predefined number of time slots, any node can access the network using a collision-detection method, thereby improving the system performance.

U.S. Pat. No. 5,544,158 discloses a multiple access method using "multiburst." The number of channels are fixed and limited. More specifically, ISDN's 2B+D is used.

SUMMARY OF THE INVENTION

The present invention discloses a method and apparatus for improving communication in a multiple access system, which comprises a plurality of communicating nodes and a communication facility linking these nodes. One of the nodes can be assigned as a controller for management and operation purposes. The communication facility is built so that it has more than one channel for communication among nodes. Each node is assigned a regular communication channel and a contention-resolution channel. In some cases, these two types of channels can be one and the same. In the case of U.S. Pat. No. 5,563,883, the regular communication channel comprises the primary and secondary (backup) communication channels. The contention resolution channels can be assigned dynamically to communicating nodes based on network condition, node behavior, and QoS policy.

When a collision is detected by the communicating nodes, nodes engaged in the contention switch to the contention-resolution channel for contention resolution process while nodes not engaged in the contention continue their normal operation in the regular channel. After the contention is resolved and communication is accomplished, the nodes that have switched will switch back to their regular channel. Any nodes with existing protocol will simply stay on the regular channel and resolve the contention in the existing fashion. Therefore, backward compatibility is achieved.

Therefore, the benefits of the present invention are:
Flexibility—dynamic allocation of channels for contention vs. fixed assignment;
Efficiency—parallel operation for non-contending nodes to reduce down-time of network;
Reduced group for contention resolution with parallel operation to speed up contention resolution process;
Support of different service quality levels based on varying group size;
Compatibility with existing protocol; and
Smooth growth path for protocol and network facility.

A method and apparatus is disclosed for improving quality-of-service (QoS) by parallel operation in a multiple access network.

A communication system comprises a plurality of communicating nodes and communication facilities linking these nodes. The communication facility is constructed so that it has more than one channel for communication among these communicating nodes using many different means, such as with separate time slots, different frequency bands, coding scheme, separate physical media, or a combination of the above. Each node is assigned a regular communication channel and a contention-resolution channel. In some cases, these two types of channels can be one and the same.

When a collision is detected by the communicating nodes, nodes engaged in the contention switch to the contention-resolution channel for contention resolution process while nodes not engaged in the contention continue their normal operation in the regular channel. After the contention is resolved and communication is accomplished, the nodes that have switched will switch back to their regular channel. Any nodes with existing protocol will simply stay on the regular channel and resolve the contention in the existing fashion. Therefore, backward compatibility is achieved.

The present invention offers a flexible way to adjust for network performance by dynamically allocating channels to be assigned dynamically to communicating nodes. The multiple access operation is improved via parallel operation for non-contending nodes, and smaller group of nodes for contention resolution. Support of different A service quality levels based on varying group size is made possible in a multiple access network while providing compatibility with existing protocol. The present invention offers a smooth growth path for protocol and network facility.

DETAILED DESCRIPTION OF THE PREFERRED EMBODIMENT

Figure 1:
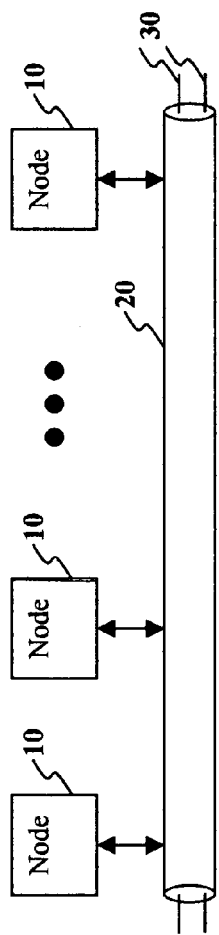
FIG. 1 depicts a typical multiple access communication system.
Figure 2:
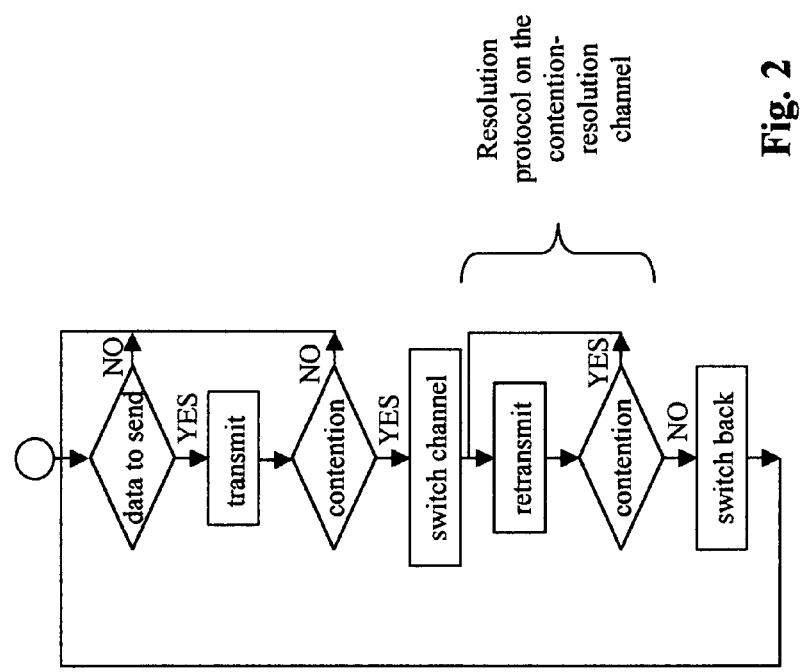
FIG. 2 illustrates logical flow diagram of communicating nodes.

As illustrated in FIG. 1, a plurality of nodes 10 are connected to a multiple access network 20, which is further divided into a plurality of communicating channels 30. In addition to the communication channel(s) of the physical layer protocol of an existing protocol, a plurality of communicating channels can be constructed using many different means, such as with separate time slots, different frequency band, coding scheme, separate physical media, or a combination of the above.

The allocation of these contention resolution channels can be performed dynamically based on the network condition and the capabilities of the communicating nodes. For example, when only a subset of the communicating nodes have access to a separate contention resolution channel, these nodes can use this contention resolution channel independent from the others for contention resolution process. Assignment of these contention resolution channels to the nodes can also be executed dynamically based on the network condition, resources available, network load, node behavior and QoS policy, etc.

Upon detection of a collision, nodes involved in the contention will switch to their assigned contention resolution channel. The contention-resolution protocol can be based on either a new protocol designed specifically for contention resolution or the original protocol, i.e., exponential back-off with random interval in the case of CSMA/CD, or contention polling in case of U.S. Pat. No. 5,563,883. The nodes not involved in the contention and the nodes not having implemented the contention resolution channel scheme will continue with their normal operation on the regular channel with the existing protocol. This method allows a backward compatibility for communication nodes using existing protocol while offering a smooth migration for enhanced implementation.

In the case of U.S. Pat. No. 5,563,883, the improvement of the contention resolution process is from $\log_2 N$ to $\log_2 N/X$ given there are X spare contention-resolution channels, which are equally distributed to all N nodes, which have the same probability of engaging in a contention. Meanwhile, the regular traffic is not interrupted.

It should be noted that, given that the same protocol is used in both regular and contention-resolution channels and the communicating nodes sharing the same behavior pattern, the patented multiple access system exhibits the same behavior probabilistically in the worst case. The improvement of network performance is derived from either the separation of communicating nodes into smaller group, or improved channel characteristics, i.e., transmission speed and quality. The present invention enables more efficient communication in reasonably loaded network while offering facility to provide different QoS levels.

Figure 3:
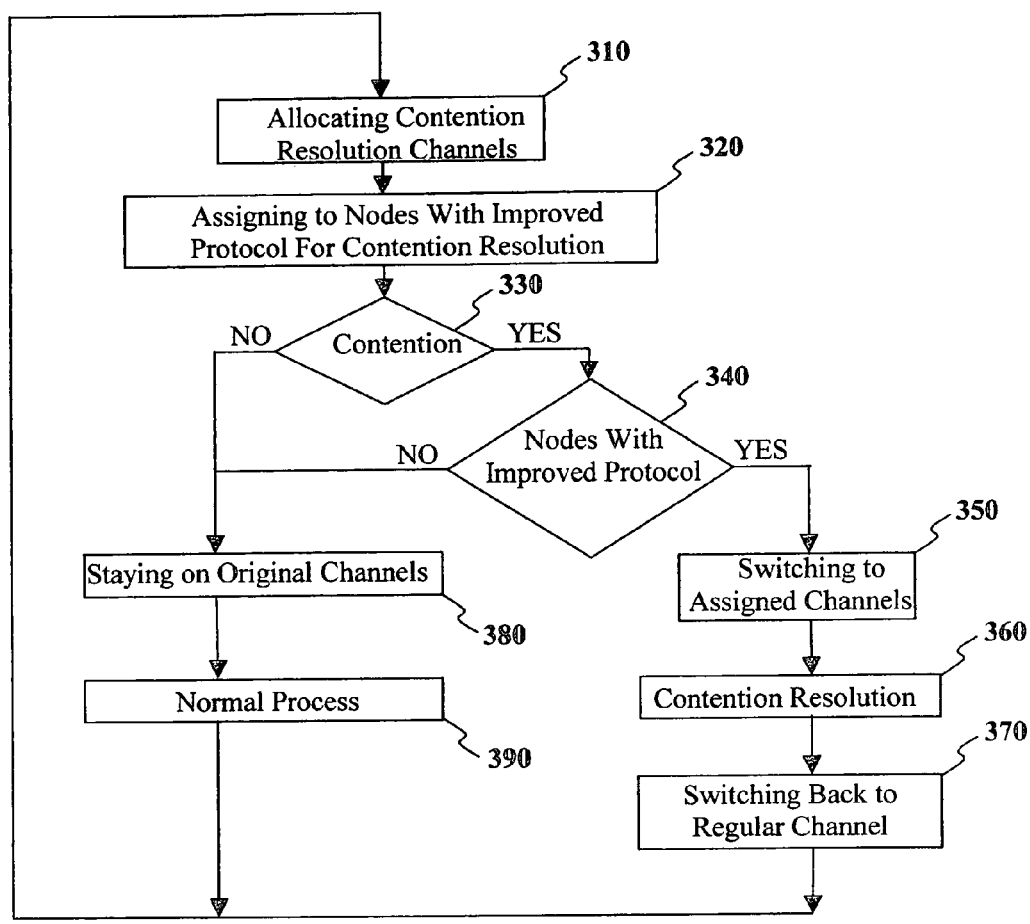
FIG. 3 illustrates a flow diagram of the operation of an apparatus for parallel operation in a multiple access network.

FIG. 3 shows one embodiment of the system according to the present invention, which discloses a method and apparatus for parallel operation in a multiple access network having a plurality of communicating nodes and communication network facilities. This Figure does not necessarily set forth all of the steps associated with the system of the present invention, steps can be added and steps can be removed. One embodiment for parallel operation in a multiple access network having a plurality of communicating nodes and communication network facilities can include the following steps: a) allocating a plurality of communicating channels some or all of which may be used as spare contention resolution channels, in addition to a regular communicating channel or channels not allocated for contention resolution (step 310); b) assigning from the plurality of communicating channels dynamically to communicating nodes, which have implemented an improved protocol for a contention resolution process (step 320); c) detecting contention (step 330); d) determining whether nodes have implemented an improved protocol (step 340); e) switching to assigned contention resolution channels upon detecting contention for nodes which have implemented an improved protocol and are involved in a contention (step 350); f) staying on the original channel (or channels not allocated for contention resolution) for nodes which have not implemented an improved protocol or are not involved in a contention (step 380); g) performing contention resolution process on the assigned contention resolution channels (step 360) in parallel to the normal process on the regular channel or channels not allocated for contention resolution (step 390); and h) reverting back to the regular channel or channels not allocated for contention resolution upon completion of the contention resolution process for the nodes which have switched to an assigned contention resolution channel and resuming normal process (step 370).

In this method and apparatus of parallel operation in a multiple access network, the step of allocating contention resolution channel can include allocating using: a) dedicated time slots; b) using separate frequency bands; c) coding scheme; or d) separate physical communication facility. The step of allocating contention resolution channel can ensure compatibility and non-interference with the regular communicating channel. In this method and apparatus, the step of staying on the original channel can include the step of maintaining the operation of existing protocol for communicating nodes which have not implemented the improved protocol or have not been involved in a contention. The step of performing the contention resolution process can include: a) implementing an improved contention resolution protocol; and/or b) maintaining the existing protocol as on the regular channel.

The apparatus of parallel operation in a multiple access network having a plurality of communicating nodes and communication network facilities includes: a) allocating means for allocating a plurality of communicating channels in addition to a regular communicating channel, some of which may be used as spare contention resolution channels; b) assigning means for assigning from the plurality of communicating channels dynamically to communicating nodes which have implemented improved protocol for contention resolution process; c) switching means for switching to assigned contention resolution channels upon detecting contention for nodes which have implemented improved protocol and involved in the contention; d) means for staying on the original channel for nodes which have not implemented improved protocol or are not involved in the contention; e) contention resolution means for performing contention resolution process on the assigned contention resolution channels in parallel to the normal process on the regular channel; f) reverting means for switching back to the regular channel upon completion of contention resolution process; and g) resuming means for resuming normal process.

From the foregoing, it will be observed that numerous variations and modifications may be effected without departing from the true spirit and scope of the novel concept of the invention. It should be understood that no limitation with respect to the specific structure and circuit arrangements illustrated is intended or should be inferred. It is, of course, intended to cover by the appended claims all such modifications as fall within the scope of the claims.

Thus, in accordance with the invention, a Method and Apparatus for Parallel Operation In A Multiple Access Network has been provided accomplishing all of the objects, and having the features and advantages specified at the beginning of this specification. It is to be understood that the disclosed construction of the invention may be embodied in other forms within the scope of the claims.

What is claimed is:

1. A method of parallel operation in a multiple access network having a plurality of communicating nodes and communication network facilities comprising:
   (a) allocating a plurality of communicating channels contention resolution channels;
   (b) assigning selected ones or all of said plurality of communicating channels to communicating nodes which have implemented an improved protocol for contention resolution;
   (c) switching to said assigned contention resolution channels upon detecting contention;
   (d) staying on channels not allocated for contention resolution for nodes which have not implemented said improved protocol or are not involved in said contention;
   (e) performing contention resolution on said assigned contention resolution channels in parallel to a normal process performed on said channels not allocated for contention resolution;
   (f) reverting back to said channels not allocated for contention resolution upon completion of contention resolution said nodes which have switched to said assigned contention resolution channels; and
   (g) resuming normal process.

2. A method of parallel operation in a multiple access network according to claim 1, wherein said step of allocating contention resolution channels comprises using dedicated time slots.

3. A method of parallel operation in a multiple access network according to claim 1, wherein said step of allocating contention resolution channels comprises using separate frequency bands.

4. A method of parallel operation in a multiple access network according to claim 1, wherein said step of allocating contention resolution channels comprises using coding schemes.

5. A method of parallel operation in a multiple access network according to claim 1, wherein said step of allocating contention resolution channels comprises using a separate physical communication facility.

6. A method of parallel operation in a multiple access network according to claim 1, wherein said step of allocating contention resolution channels further comprises ensuring compatibility and non-interference of said contention resolution channels with said channels not allocated for contention resolution.

7. A method of parallel operation in a multiple access network according to claim 1, wherein said step of staying on said channel not allocated for contention resolution further comprises maintaining an existing protocol for communicating nodes which have not implemented said improved protocol or are not involved in said contention.

8. A method of parallel operation in a multiple access network according to claim 1, wherein said step of performing contention resolution further comprises implementing an improved contention resolution protocol.

9. A method of parallel operation in a multiple access network according to claim 1, wherein said step of performing contention resolution further comprises maintaining said existing protocol as on said channels not allocated for contention resolution.

10. An apparatus for parallel operation in a multiple access network having a plurality of communicating nodes and communication network facilities, said apparatus comprising:
   (a) means for allocating a plurality of communicating channels as contention resolution channels;
   (b) means for assigning selected ones or all of said plurality of communicating channels to communicating nodes which have an implemented improved protocol for contention resolution;
   (c) means for switching to said assigned contention resolution channels upon detecting contention;
   (d) means for staying on channels not allocated for contention resolution for nodes which have not implemented said improved protocol or are not involved in said contention;

(e) means for performing contention resolution on said assigned contention resolution channels in parallel to a normal process performed on said channels not allocated for contention resolution;

(f) means for reverting channels not allocated for contention resolution upon completion of contention resolution; and (g) means for resuming normal process.

11. An apparatus for parallel operation in a multiple access network according to claim 10, wherein said means for allocating contention resolution channels comprises using dedicated time slots.

12. An apparatus for parallel operation in a multiple access network according to claim 10, wherein said means for allocating contention resolution channels comprises using separate frequency bands.

13. An apparatus for parallel operation in a multiple access network according to claim 10, wherein said means for allocating contention resolution channels comprises using coding schemes.

14. An apparatus for parallel operation in a multiple access network according to claim 10, wherein said means for allocating contention resolution channels comprises using a separate physical communication facility.

15. An apparatus for parallel operation in a multiple access network according to claim 10, wherein said means for allocating contention resolution channels further comprises means for ensuring compatibility and non-interference of said contention resolution channels with said channels not allocated for contention resolution.

16. An apparatus for parallel operation in a multiple access network according to claim 10, wherein said means for staying on said channels not allocated for contention resolution further comprises means for maintaining an existing protocol for communicating nodes which have not implemented said improved protocol or are not involved in said contention.

17. An apparatus for parallel operation in a multiple access network according to claim 10, wherein said means for performing contention resolution further comprises means for implementing an improved contention resolution protocol.

18. An apparatus for parallel operation in a multiple access network according to claim 10, wherein said means for performing contention resolution further comprises means for maintaining said existing protocol as on said channels not allocated for contention resolution.

* * * * *